US010626946B2

(12) United States Patent
Shimozaki

(10) Patent No.: US 10,626,946 B2
(45) Date of Patent: Apr. 21, 2020

(54) DAMPER

(71) Applicant: NIFCO INC., Yokosuka-shi, Kanagawa (JP)

(72) Inventor: Kei Shimozaki, Yokosuka (JP)

(73) Assignee: NIFCO INC., Yokosuka-Shi, Kanagawa (JP)

( * ) Notice: Subject to any disclaimer, the term of this patent is extended or adjusted under 35 U.S.C. 154(b) by 0 days.

(21) Appl. No.: 15/760,828

(22) PCT Filed: Sep. 16, 2016

(86) PCT No.: PCT/JP2016/077517
§ 371 (c)(1),
(2) Date: Mar. 16, 2018

(87) PCT Pub. No.: WO2017/047775
PCT Pub. Date: Mar. 23, 2017

(65) Prior Publication Data
US 2018/0259026 A1 Sep. 13, 2018

(30) Foreign Application Priority Data

Sep. 18, 2015 (JP) .................................. 2015-184876

(51) Int. Cl.
*F16F 9/02* (2006.01)
*F16J 15/18* (2006.01)
(Continued)

(52) U.S. Cl.
CPC .............. *F16F 9/0227* (2013.01); *F16F 9/02* (2013.01); *F16F 9/0218* (2013.01); *F16F 9/32* (2013.01);
(Continued)

(58) Field of Classification Search
CPC ........ F16F 9/02; F16F 9/32; F16F 9/34; F16F 9/368; F16F 9/0218
(Continued)

(56) References Cited

U.S. PATENT DOCUMENTS

2006/0011431 A1* 1/2006 Furuya ...................... E05F 5/10
188/322.15
2006/0072965 A1* 4/2006 Yanagita ............... F16F 9/0227
403/220
(Continued)

FOREIGN PATENT DOCUMENTS

JP S53-157282 U 12/1978
JP S54127988 U 9/1979
(Continued)

OTHER PUBLICATIONS

Japan Patent Office, "Office Action for Japanese Patent Application No. 2017-540016," dated Nov. 27, 2018.
(Continued)

*Primary Examiner* — Robert A. Siconolfi
*Assistant Examiner* — San M Aung
(74) *Attorney, Agent, or Firm* — Manabu Kanesaka

(57) ABSTRACT

A damper includes a piston and a cylinder housing the piston, and generates a braking force based on a movement or relative movement of the piston. The piston includes a trunk portion and a seal ring surrounding the trunk portion. A first seal portion against an inner wall of the cylinder is formed on an outer peripheral portion in the seal ring, and a second seal portion against a circumference wall portion projecting from the trunk portion is formed in a front end portion positioned on a pressure chamber side. Also, a support rib portion is provided outside the trunk portion, which allows the seal ring to move within a predetermined range along a moving direction of the piston in a state wherein a movement gap for a fluid is formed between the trunk portion and an inner peripheral portion of the seal ring.

8 Claims, 8 Drawing Sheets

(51) Int. Cl.
*F16J 15/3204* (2016.01)
*F16F 9/32* (2006.01)
*F16F 9/34* (2006.01)
*F16F 9/36* (2006.01)
*F16F 9/348* (2006.01)
*E05F 5/10* (2006.01)

(52) U.S. Cl.
CPC .............. *F16F 9/34* (2013.01); *F16F 9/3405* (2013.01); *F16F 9/3481* (2013.01); *F16F 9/368* (2013.01); *F16J 15/18* (2013.01); *F16J 15/3204* (2013.01); *E05F 5/10* (2013.01); *F16F 2230/30* (2013.01)

(58) Field of Classification Search
USPC .......... 188/281, 266.6, 322.15; 267/120, 124
See application file for complete search history.

(56) References Cited

U.S. PATENT DOCUMENTS

| | | | | |
|---|---|---|---|---|
| 2009/0084645 | A1* | 4/2009 | Okabayashi | F16F 9/0218 188/266.6 |
| 2010/0127606 | A1 | 5/2010 | Collene et al. | |
| 2010/0253101 | A1* | 10/2010 | Seto | F16F 9/516 292/336.3 |
| 2011/0127129 | A1* | 6/2011 | Okabayashi | F16F 9/3415 188/282.1 |
| 2012/0175830 | A1 | 7/2012 | Yang | |
| 2014/0150644 | A1* | 6/2014 | Harada | F16F 9/0218 92/172 |
| 2014/0151170 | A1* | 6/2014 | Harada | F16F 9/34 188/280 |

FOREIGN PATENT DOCUMENTS

| | | |
|---|---|---|
| JP | S57-56356 A | 4/1982 |
| JP | S57-56356 U | 4/1982 |
| JP | 2000-074122 A | 3/2000 |
| JP | 2013-24285 A | 2/2013 |
| WO | 2015/093548 A1 | 6/2015 |

OTHER PUBLICATIONS

PCT/ISA/210, "International Search Report for International Application No. PCT/JP2016/077517," dated Oct. 18, 2016.
Europe Patent Office, "Search Report for European Patent Application No. 16846646.4," dated Apr. 25, 2019.

* cited by examiner

DAMPER

FIELD OF TECHNOLOGY

The present invention relates to an improvement of a damper.

BACKGROUND ART

As for a damper comprising a piston and a cylinder storing the piston, and generating a braking force based on a movement or relative movement of the piston, there is a damper disclosed in Patent Document 1.

In such a damper, while generating the braking force when the piston moves forward in a direction of extending a pressure chamber, the piston can move backward in a direction of reducing the pressure chamber with a small resistance.

Namely, in the Patent Document 1, at a time of the aforementioned forward movement, an outer peripheral portion of a seal ring 300 surrounding an outside of a piston 100 slidingly contacts an inner wall of a cylinder 200, and an inner peripheral portion of the seal ring 300 contacts a trunk portion 101 of the piston 100 (see FIG. 11). On the other hand, the seal ring 300 can move in the trunk portion 101 of the piston 100 within a predetermined range along a moving direction of the piston 100, and at a time of the aforementioned backward movement, the seal ring 300 moves in a direction of separating from a pressure chamber 400 so as to position the inner peripheral portion thereof on a ventilation groove 102 formed in the trunk portion 101 of the piston 100 (see FIG. 12). Thereby, at the time of the backward movement, the backward movement can be carried out by an exhaust air from the pressure chamber through the ventilation groove 102 with the small resistance.

However, in the Patent Document 1, the exhaust air at the time of the backward movement remains to a limited one through the ventilation groove 102, and in order to ensure such exhaust air, the seal ring 300 is required to move the inner peripheral portion thereof up to a position located above the ventilation groove 102, and it is structurally incapable of ensuring the exhaust air without a time lag at the same time of starting the backward movement. Also, for example, in a case of being applied to buffering of an opening operation of an opening and closing member such as a glove box of an automobile and the like, in the time lag of the exhaust air, when a force in an excessive opening direction is applied to the opening and closing member such as the glove box and the like, a force in a direction to close the opening and closing member is generated in the opening and closing member by a sharp increase of an inner pressure of the pressure chamber, so as to cause a rebound of the opening and closing member in a closing direction unintended by a user, i.e., a rebound phenomenon.

PRIOR ART DOCUMENT

Patent Document

Patent Document 1: Japanese Unexamined Patent Application Publication No. 2013-24285

SUMMARY OF THE INVENTION

Problems to be Solved by the Invention

A main object of the present invention is that, in this type of damper, a resistance when the piston forming the damper moves backward can be reduced at the time of starting the backward movement as little as possible, and that such a damper is made rationally and properly, i.e., as a one-way damper.

Means for Solving the Problems

In order to obtain the aforementioned object, in the present invention, in a first aspect, a damper comprises a piston and a cylinder housing the piston, and generates a braking force based on a movement or relative movement of the piston. Also, the aforementioned piston includes a trunk portion and a seal ring surrounding the trunk portion. Also, a first seal portion against an inner wall of the cylinder is formed in an outer peripheral portion in the seal ring, and a second seal portion against a circumference wall portion projecting from the trunk portion is formed on a pressure chamber side. Also, the damper allows the seal ring to move within a predetermined range along a moving direction of the piston in a state wherein a movement gap for a fluid is formed between the trunk portion and an inner peripheral portion of the seal ring.

Also, in order to obtain the aforementioned object, in the present invention, in a second aspect, the damper comprises the piston and the cylinder housing the piston, and generates the braking force based on the movement or relative movement of the piston. Also, the piston includes the trunk portion and the seal ring surrounding the trunk portion. Also, the first seal portion against the inner wall of the cylinder is formed in the outer peripheral portion in the seal ring, and the second seal portion against the circumference wall portion projecting from the trunk portion is formed in a front end portion positioned on the pressure chamber side. Also, outside the trunk portion, there is provided a support portion allowing the seal ring to move within the predetermined range along the moving direction of the piston in the state wherein the movement gap for the fluid is formed between the trunk portion and the inner peripheral portion of the seal ring.

At a time of a forward movement of the piston which enlarges a pressure chamber, the first seal portion of the seal ring contacts the inner wall of the cylinder, and the second seal portion contacts the circumference wall portion so as to seal between the cylinder and the trunk portion of the piston, and to generate the braking force based on the forward movement of the piston. At a time of a backward movement of the piston, the second seal portion of the seal ring and the circumference wall portion can be separated. A discharge flow path of the fluid from the inside of the pressure chamber is maximized by the movement gap for the fluid formed between the inner peripheral portion of the seal ring and the trunk portion as much as possible. At the same time of backward movement of the piston, the circumference wall portion and the second seal portion of the seal ring are separated so as to carry out the aforementioned backward movement from the beginning of such backward movement with a small resistance.

In one aspect of the present invention, two or more support portions are provided at an interval in a direction of surrounding a moving center axis of the piston.

Also, in one aspect of the present invention, a front end portion positioned on the pressure chamber side of the support portion is integrated with the circumference wall portion, and at a back end portion of the support portion, there is formed a movement control portion rising on an inner wall side of the cylinder.

Also, in one aspect of the present invention, the seal ring is provided with a circumference projecting portion projecting backwardly from a base portion positioned on the pressure chamber side, wherein an outer peripheral portion on a projecting end side thereof is the first seal portion.

Also, in one aspect of the present invention, the seal ring is provided with an inner circumference projecting portion projecting backwardly from the base portion inside the circumference projecting portion, wherein a projecting end side thereof is a sliding contact portion against the support portion.

Also, in one aspect of the present invention, a projecting size from the base portion of the circumference projecting portion is larger than a projecting size form the base portion of the inner circumference projecting portion.

Also, in one aspect of the present invention, the second seal portion is formed by a circumference projecting piece formed in a front end portion of the seal ring.

Effect of the Invention

According to the present invention, in the damper comprising the piston and the cylinder storing the piston, and generating the braking force based on the movement or relative movement of the piston, a resistance at the time of the backward movement of the piston forming the damper can be reduced as little as possible at the same time of starting the backward movement, and such damper can be made rationally and properly, i.e., as a one-way damper. Also, in a case of applying to buffering of an opening operation of an opening and closing member such as a glove box of an automobile and the like, when a force in an excessive opening direction is applied to the opening and closing member, even if a force in a direction of closing the opening and closing member is generated by a sharp increase of an inner pressure in the pressure chamber, the inner pressure is released instantly so as not to cause a rebound of the opening and closing member in a closing direction unintended by a user, i.e., a rebound phenomenon.

BEST MODES OF CARRYING OUT THE INVENTION

Figure 1:
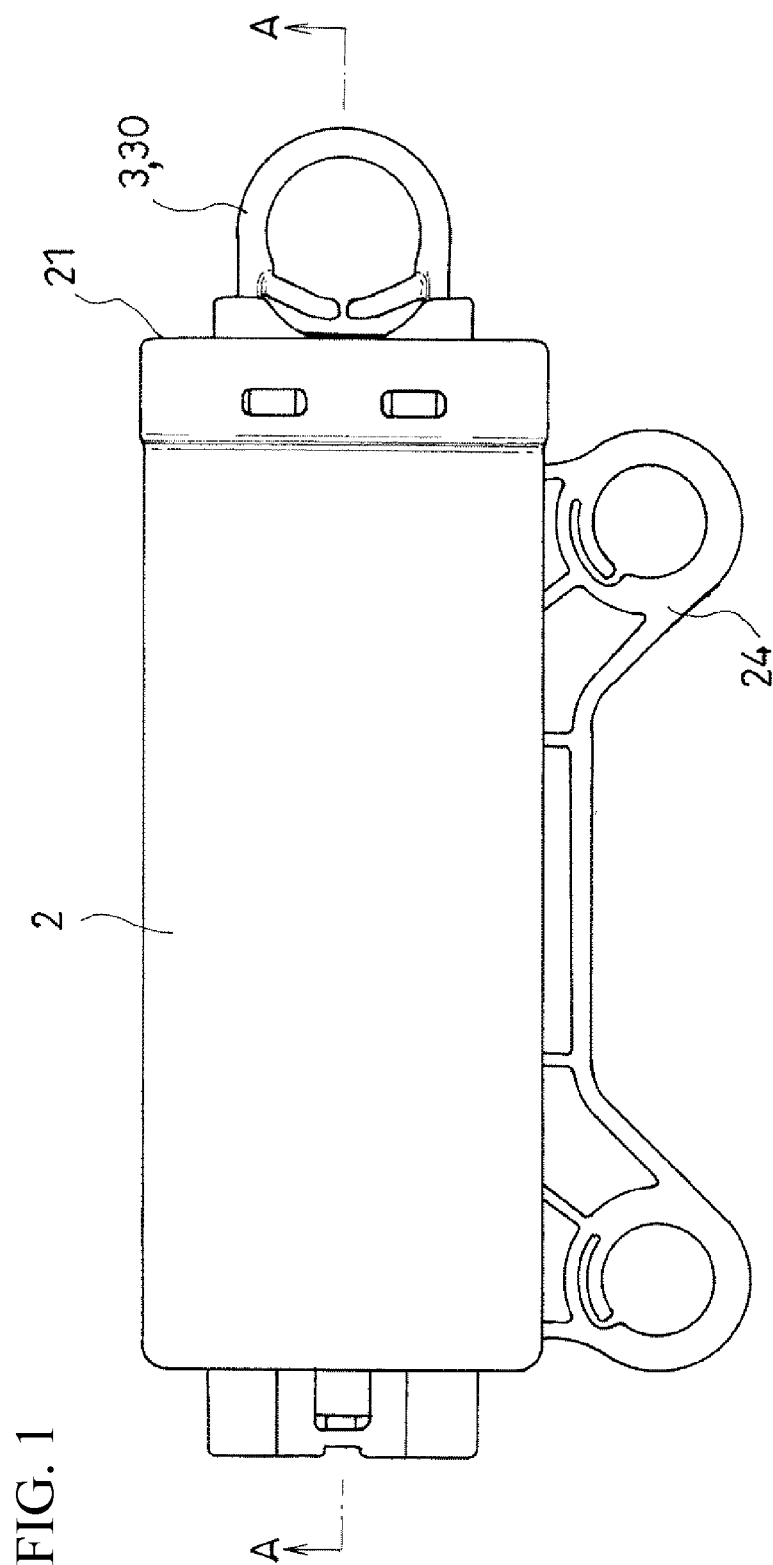
FIG. 1 is a front view of a damper (first example) according to one embodiment of the present invention.
Figure 2:
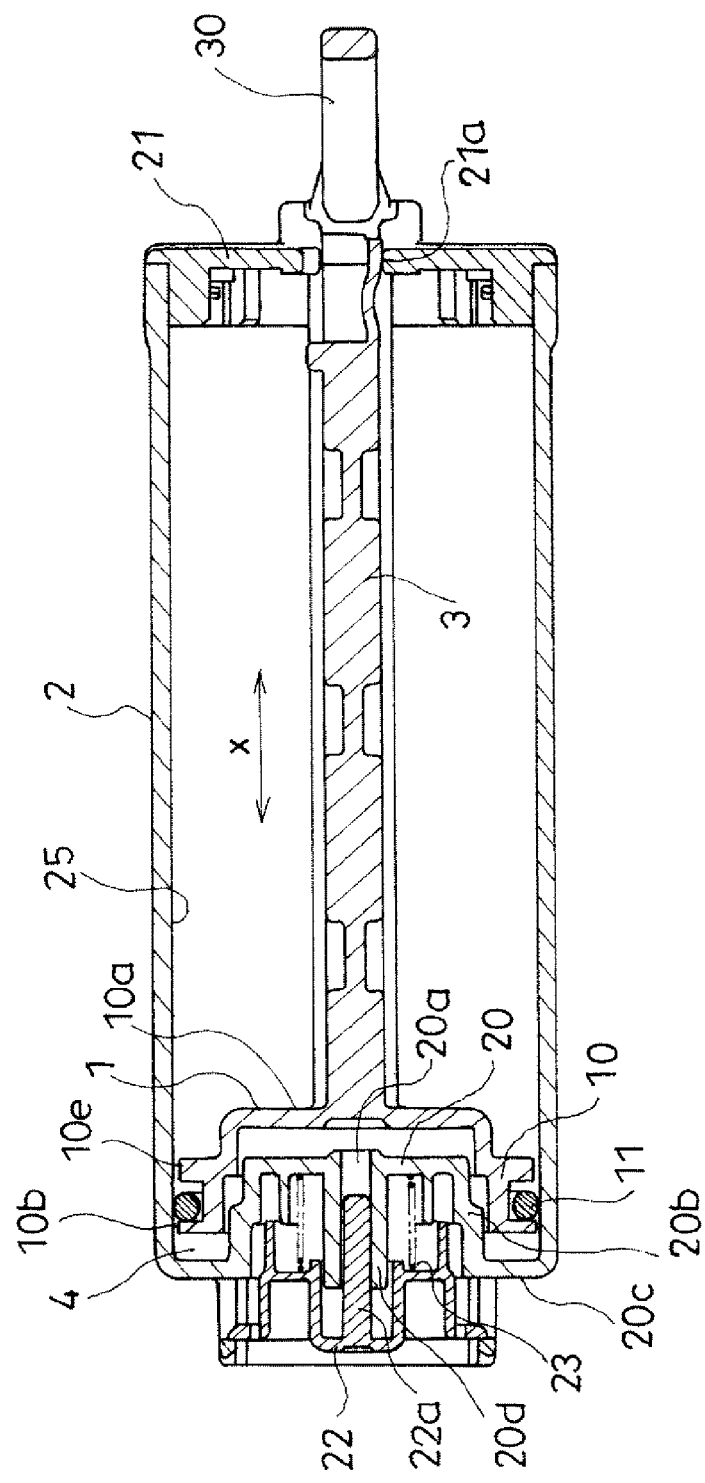
FIG. 2 is a cross-sectional view taken along line A-A in FIG. 1.
Figure 3:
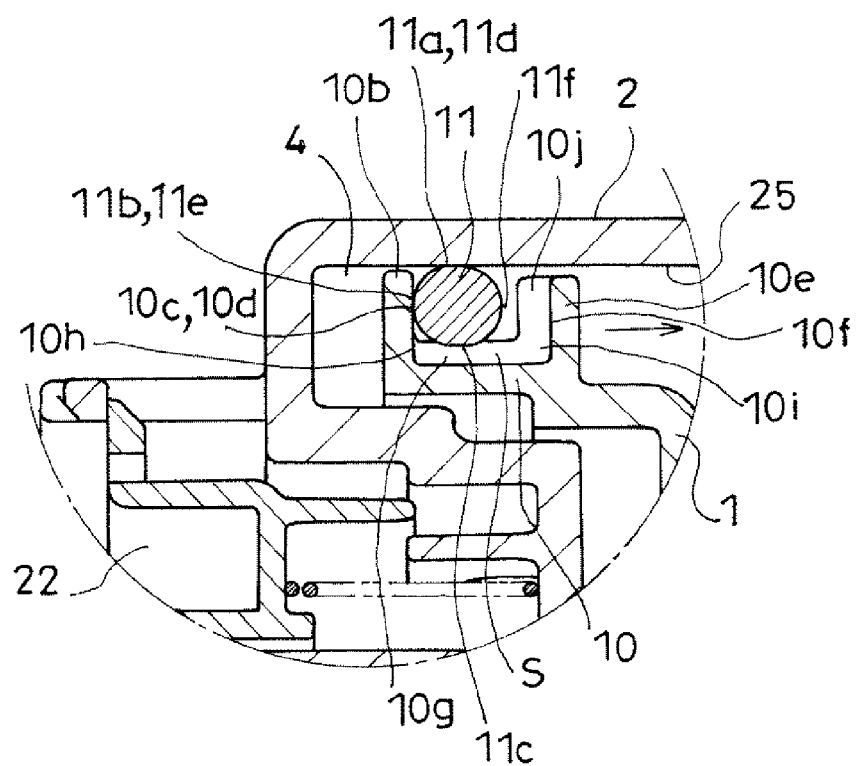
FIG. 3 is a cross-sectional view of essential parts of the first example, and shows a condition when a piston moves forward.
Figure 4:
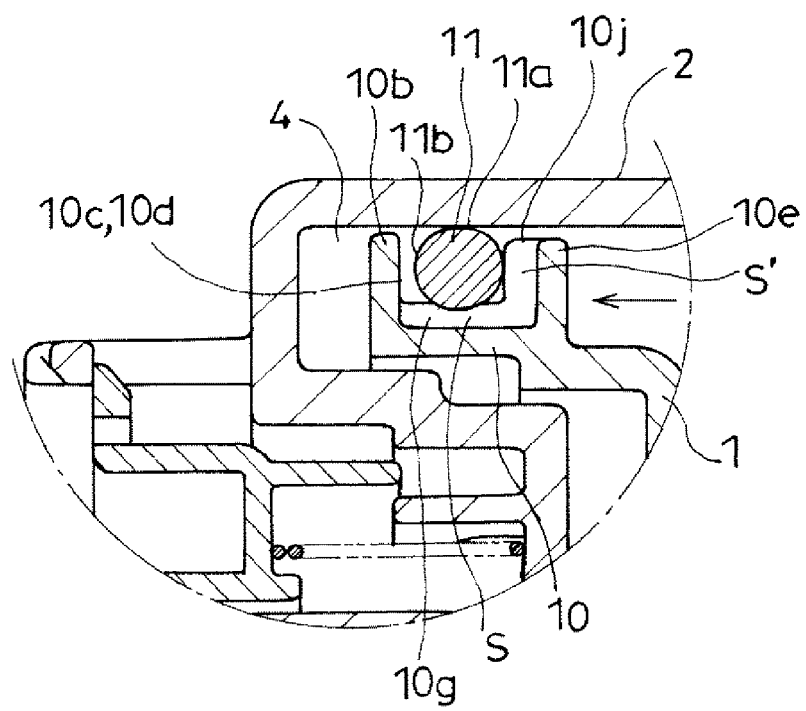
FIG. 4 is a cross-sectional view of the essential parts of the first example, and shows a condition when the piston moves backward.
Figure 5:
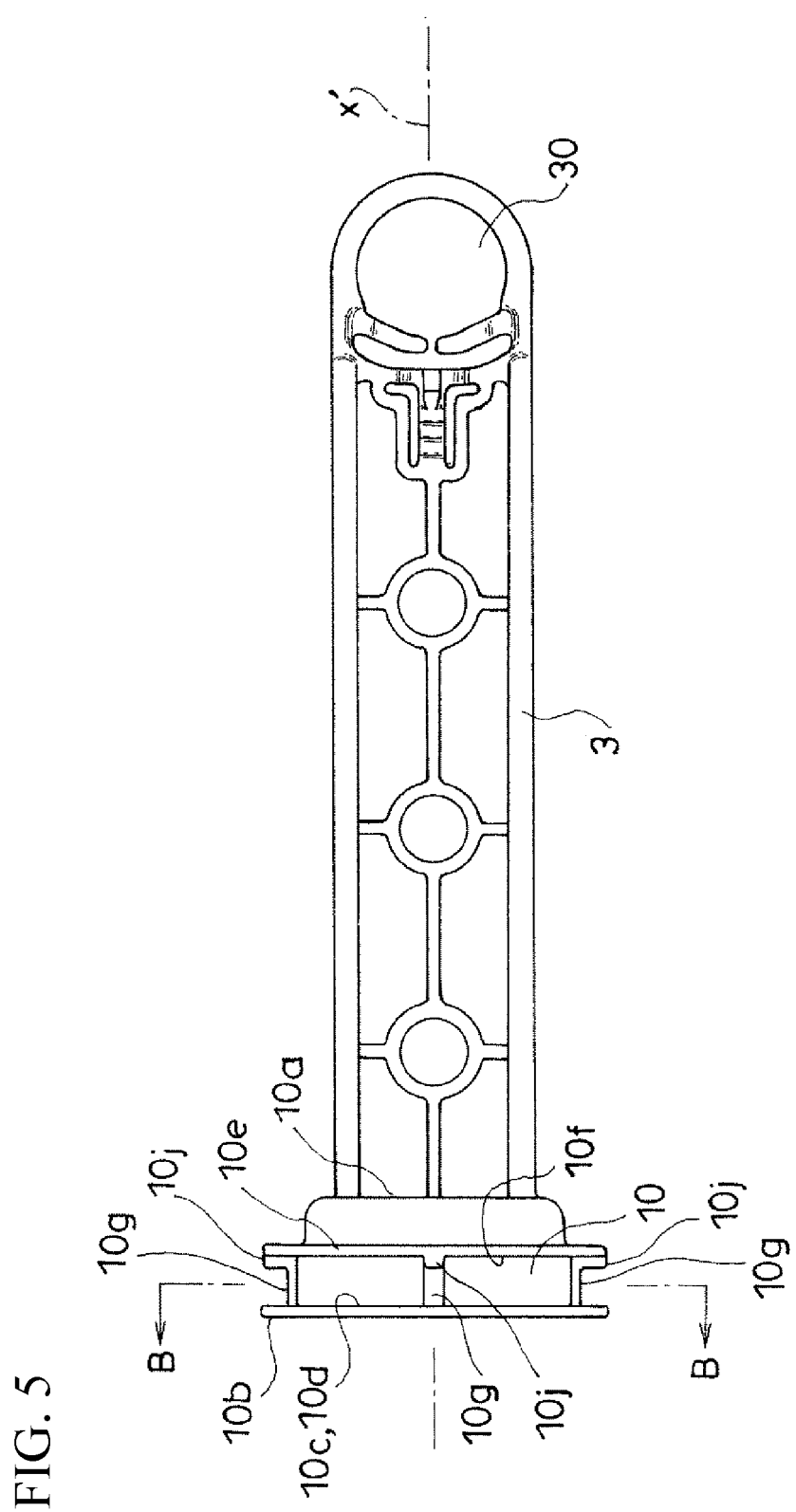
FIG. 5 is a front view of the piston provided with a rod forming the first example.
Figure 6:
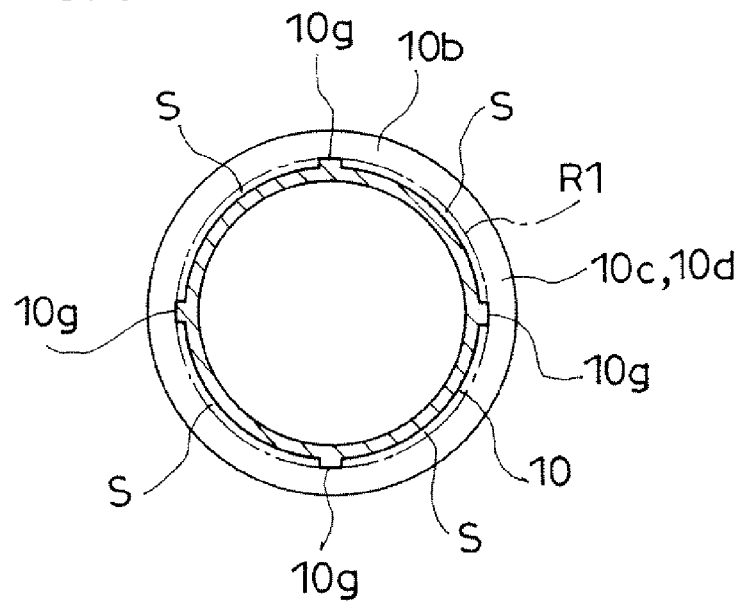
FIG. 6 is a cross-sectional view taken along line B-B in FIG. 5.

Hereinafter, based on FIG. 1 to FIG. 10, typical embodiments of the present invention will be explained. Dampers according to the embodiments generate a braking force based on a movement or relative movement of a piston 1 forming the damper. Typically, the damper is assembled with an article provided with a movable portion or the like (omitted in the drawings) which becomes an object to be braked, and used for applying the braking force to a movement of such object so as to move such object slowly and properly, with a feeling of a high quality, or prevent such braking object from moving extraordinarily.

First, the damper according to a first example of the present invention shown in FIG. 1 to FIG. 6 will be described in detail.

Such damper comprises the piston 1, and a cylinder 2 storing the piston 1.

In the illustrated example, the piston 1 is integrated with an inner end of a rod 3, and typically, such damper directly or indirectly links either one of the rod 3 or the cylinder 2 on the aforementioned braking object side, and directly or indirectly links the other of the rod 3 or the cylinder 2 on a side movably supporting such braking object so as to be assembled with the article provided with such braking object.

In the illustrated example, the cylinder 2 has a cylindrical shape. The shape of such cylinder 2 may be appropriately changed as necessary such that the shape of such cylinder 2 has, for example, a flat cylindrical shape.

In the illustrated example, one cylinder end of the cylinder 2 is closed by a wall portion 20 provided with a passage hole 20a for a fluid at a center. The space between the piston 1 and such wall portion 20 functions as a pressure chamber 4. On the other hand, the other cylinder end of the cylinder 2 is closed by a cap 21 provided with a passage portion 21a for the rod 3 at a center.

The wall portion 20 is provided with a cylindrical projecting portion 20b disposed in such a way so as to position one open end on the same face as one cylinder end of the cylinder 2, and to position a remaining portion thereof inside the cylinder 2; and a circumference face portion 20c connecting the one open end of the cylindrical projecting portion 20b and an edge of one cylinder end of the cylinder 2. Inside the cylindrical projecting portion 20b, there is disposed a tube member 20d extending to an opening side of the cylindrical projecting portion 20b by integrating one end at a center of a bottom portion of the cylindrical projecting portion 20b, and the inside and outside of the cylinder 2 communicate through an inner portion of the tube member 20d. Namely, in the illustrated example, such tube member 20d functions as the aforementioned passage hole 20a.

Also, in the illustrated example, outside the wall portion 20, there is supported a movable member 22 provided with a shaft portion 22a which enters into the passage hole 20a to be capable of moving in an axis line direction of the cylinder 2. Between such movable member 22 and the wall portion 20, there is installed a compression coil spring shown by the reference numeral 23 in the drawings, and the movable member 22 is positioned at a standard position (position in FIG. 2) by the spring 23.

A movement in a direction of enlarging the pressure chamber 4 where a distance between the piston 1 and the wall portion 20 is widened (hereinafter, a movement of the piston 1 in this direction is called a forward movement, and a movement of the piston 1 in a direction opposite to the forward movement is called a backward movement) is allowed by a movement of the fluid through the passage hole 20a, in the illustrated example, by ventilation through the passage hole 20a.

In the illustrated example, due to a pressure change in the pressure chamber 4 by the piston 1 moved forward, the movable member 22 moves in a direction of narrowing a distance between the movable member 22 and the wall portion 20 against an urging force of the spring 23. As a movement amount of the movable member 22 becomes larger, an entry amount of the shaft portion 22a into the passage hole 20a becomes larger, so that the fluid is difficult to pass through the passage hole 20a, and the piston 1 is difficult to move forward. Thereby, in the illustrated example, as a movement speed of the piston 1 becomes faster, the movement amount of the movable member 22 becomes larger, and the braking force relative to the movement of the piston 1 becomes larger. Namely, the damper of the illustrated example functions as a damper with a speed response type, or a load response type.

In the illustrated example, the rod 3 has a rod shape long in a moving direction of the piston 1. At an outer end positioned outside the cylinder 2 in the rod 3, there is formed a bracket portion 30 for the aforementioned linking. Also, outside a side portion of the cylinder 2, there is formed a bracket portion shown by the reference numeral 24 in the drawings for the aforementioned linking.

The piston 1 includes a trunk portion 10 and a seal ring 11 surrounding the trunk portion 10.

In the illustrated example, the trunk portion 10 has a short cylindrical shape. A cylinder end side facing an inner face of the wall portion 20 of the cylinder 2 in the trunk portion 10, i.e., the cylinder end side facing the pressure chamber 4 is open, and a cylinder end side opposite to the aforementioned cylinder end side is closed. The inner end of the rod 3 is integrated at a center of an outer face of a closing portion 10a of the trunk portion 10.

At an open edge positioned on a side facing the pressure chamber 4 of the trunk portion 10, there is formed a first circumference outer flange 10b. An outer diameter of the trunk portion 10 at a position where the first circumference outer flange 10b is formed is slightly smaller than an inner diameter of the cylinder 2. There is formed a second circumference outer flange 10e between the first circumference outer flange 10b and the closing portion 10a. An outer diameter of the trunk portion 10 at a position where the second circumference outer flange 10e is formed is slightly smaller than the outer diameter of the trunk portion 10 at the position where the first circumference outer flange 10b is formed.

An inner diameter of the trunk portion 10 has a size which can receive the cylindrical projecting portion 20b. In the illustrated example, in a position where the piston 1 is completely moved backward, the first circumference outer flange 10b contacts an inner face of the circumference face portion 20c, and the cylindrical projecting portion 20b is housed in an inner portion of the trunk portion 10.

The seal ring 11 is typically formed by rubber or plastic having a rubber-like elasticity.

In an outer peripheral portion 11d in such seal ring 11, there is formed a first seal portion 11a against an inner wall 25 of the side portion of the cylinder 2. Also, in a front end portion 11e positioned on a pressure chamber 4 side, there is formed a second seal portion 11b abutting against a circumference wall portion 10d, which is a wall portion projecting in a direction orthogonal to a moving direction x of the piston 1 from the trunk portion 10, and is formed in such a way so as to surround a moving center axis x' (see FIG. 5) of the piston 1, from a back side. Such seal ring 11 has a maximum outer diameter which is slightly larger than the inner diameter of the cylinder 2, and substantially has an annular shape. A size of the moving direction x (see FIG. 2) of the piston 1 in the seal ring 11 is smaller than a distance between the first circumference outer flange 10b and the second circumference outer flange 10e in the trunk portion 10, and is also smaller than a distance between the first circumference outer flange 10b and the later-described movement control portion 10j. Thereby, at a time of the forward movement of the piston 1, the seal ring 11 presses the front end portion 11e against a face portion 10c on a side facing the second circumference outer flange 10e in the first circumference outer flange 10b. On the other hand, at a time of the backward movement of the piston 1, the seal ring 11 can move within a predetermined range along the moving direction of the piston 1 in such a way so as to separate the front end portion 11e from the face portion 10c. Namely, in the illustrated example, the face portion 10c on the side facing the second circumference outer flange 10e in the first circumference outer flange 10b functions as the circumference wall portion 10d.

Also, outside the trunk portion 10, there are formed support rib portions 10g functioning as a support portion allowing the seal ring 11 to move within the aforementioned predetermined range along the moving direction x of the piston 1 in a state wherein a movement gap s of the fluid is formed between the trunk portion 10 and an inner peripheral portion 11c of the seal ring 11.

In the embodiment, two or more support rib portions 10g are provided at an interval between adjacent support rib portions 10g in a direction of surrounding the moving center axis x' (see FIG. 5) of the piston 1. In the illustrated example, four support rib portions 10g are provided at an interval of 90 degrees in the direction of surrounding the moving center axis x' of the piston 1 (see FIG. 6).

In the illustrated example, such support rib portions 10g have a projecting piece shape extending along the moving direction x of the piston 1. In the seal ring 11, the inner peripheral portion 11c is supported by such support rib portions 10g, and the outer peripheral portion 11d slidingly contacts the inner wall 25 of the side portion of the cylinder 2. Namely, a diameter of a virtual circle R1 (see FIG. 6) passing projecting ends of the four support rib portions 10g is substantially equal to an inner diameter of the seal ring 11.

At the time of the forward movement of the piston 1 which enlarges the pressure chamber 4, the first seal portion 11a of the seal ring 11 contacts the inner wall 25 of the side portion of the cylinder 2, and the second seal portion 11b contacts the circumference wall portion 10d so as to seal between the cylinder 2 and the trunk portion 10 of the piston 1, to limit a fluid inflow into the pressure chamber 4 to the passage hole 20a, and to generate the braking force based on the forward movement of the piston 1. At the time of the backward movement of the piston 1, the second seal portion 11b of the seal ring 11 and the circumference wall portion 10d can be separated. The inner peripheral portion 11c of the seal ring 11 contacts only the support rib portions 10g, and as for the remaining portions of the above, they all become the movement gap s of the fluid between the inner peripheral portion 11c of the seal ring 11 and the trunk portion 10 (see FIG. 6), so that a discharge flow path of the fluid from the inside of the pressure chamber 4 is maximized as much as possible. Namely, at the time of the backward movement of the piston 1, the fluid inside the pressure chamber 4 is discharged to the back side of the piston 1 through between the first circumference outer flange 10b and the inner wall 25 of the cylinder 2; between the circumference wall portion 10d and the second seal portion 11b of the seal ring 11; the movement gap s; and between the second circumference outer flange 10e and the inner wall 25 of the cylinder 2, so as to smoothly carry out the backward movement of the piston 1, the backward movement of the piston 1 to a position before the movement, i.e., the position where the piston 1 is completely moved backward, and eventually a returning operation to a position before the braking object is movable, with a small resistance. Also, at the same time of backward movement of the piston 1, the circumference wall portion 10d and the second seal portion 11b of the seal ring 11 are separated so as to carry out the aforementioned backward movement from the beginning of such backward movement with the small resistance. Namely, the damper of the present embodiment functions as the damper operating the braking force to the braking object only at the time of the forward movement as a one-way damper.

Also, in the present embodiment, a front end portion 10h positioned on the pressure chamber 4 side of the support rib portion 10g is integrated with the circumference wall portion 10d, and at a back end portion 10i of the support rib portion 10g, there is formed the movement control portion 10j rising on an inner wall 25 side of the cylinder 2. In the illustrated example, the movement control portion 10j is integrated with the support rib portion 10g, has a thickness same as that of the support rib portion 10g, and positions the projecting end at a position on a face same as the second circumference outer flange 10e. In the illustrated example, the back end portion 10i of the support rib portion 10g is integrated with a face 10f facing the first circumference outer flange 10b in the second circumference outer flange 10e, and the movement control portion 10j integrates a lower end with the back end portion 10i of the support rib portion 10g, and has a fin-like shape projecting forward from the face 10f (see FIG. 3). Thereby, at the time of the backward movement of the piston 1, falling of the seal ring 11 is prevented, and a gap s' communicating the aforementioned movement gap s is ensured at a back side of a back end portion 11f of the seal ring 11 (see FIG. 4).

Incidentally, the movement control portion 10j is sufficient provided that the movement control portion 10j has a type of forming a gap allowing the fluid to be discharged to the back side of the piston 1 through the movement gap s, and may be formed at an outer face portion of the trunk portion 10 in such a way so as to form a separate member from the support rib portion 10g.

In the first example shown in FIG. 1 to FIG. 6, the seal ring 11 is an O-ring wherein a cross section thereof in a radial direction thereof has substantially a circular shape.

Figure 7:
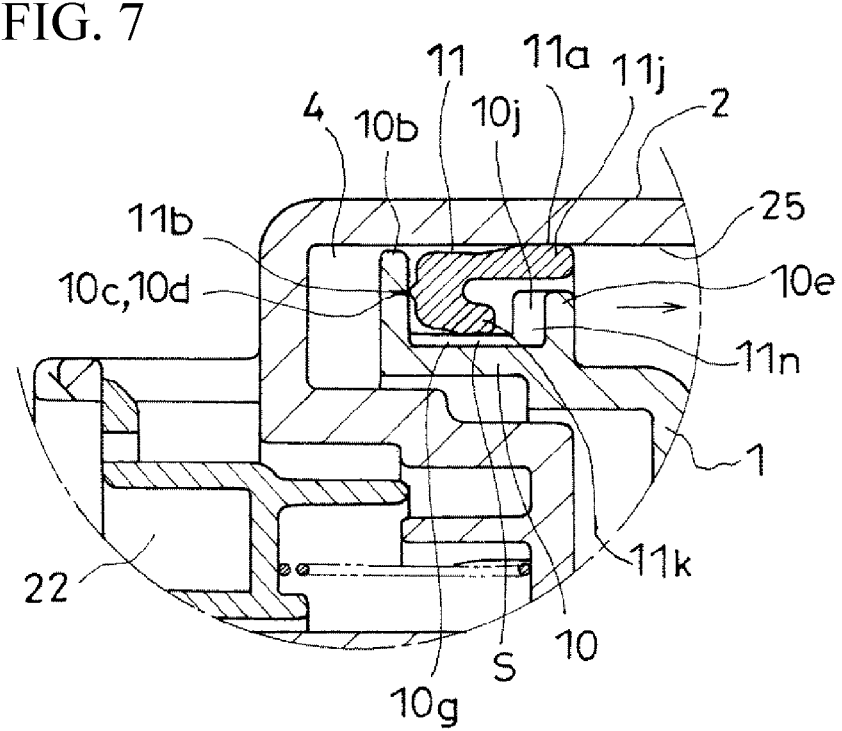
FIG. 7 is an enlarged cross-sectional structural view of the essential parts of the damper (second example) according to one embodiment of the present invention, and shows a state when the piston moves forward.
Figure 8:
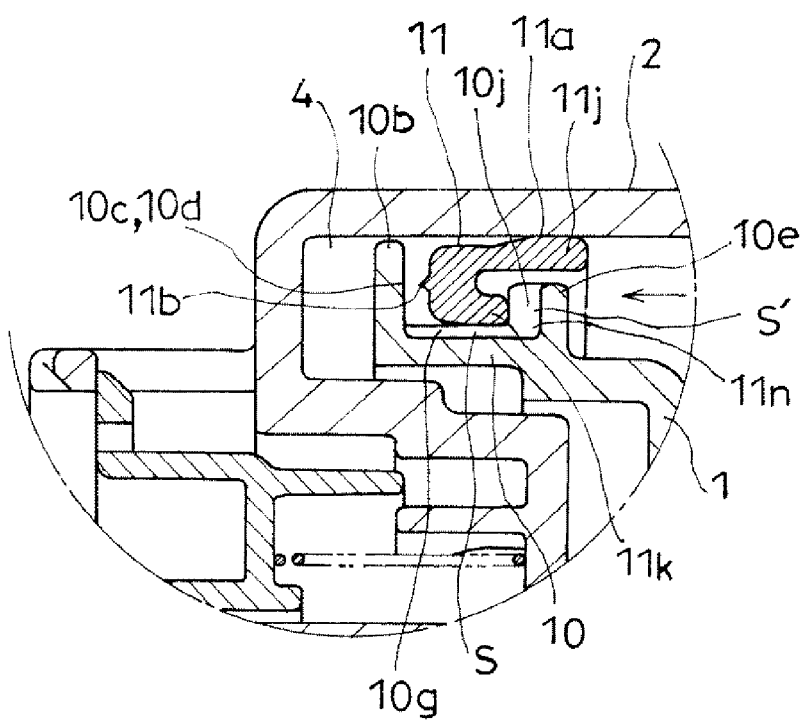
FIG. 8 is an enlarged cross-sectional structural view of the essential parts of the second example, and shows a state when the piston moves backward.
Figure 9:
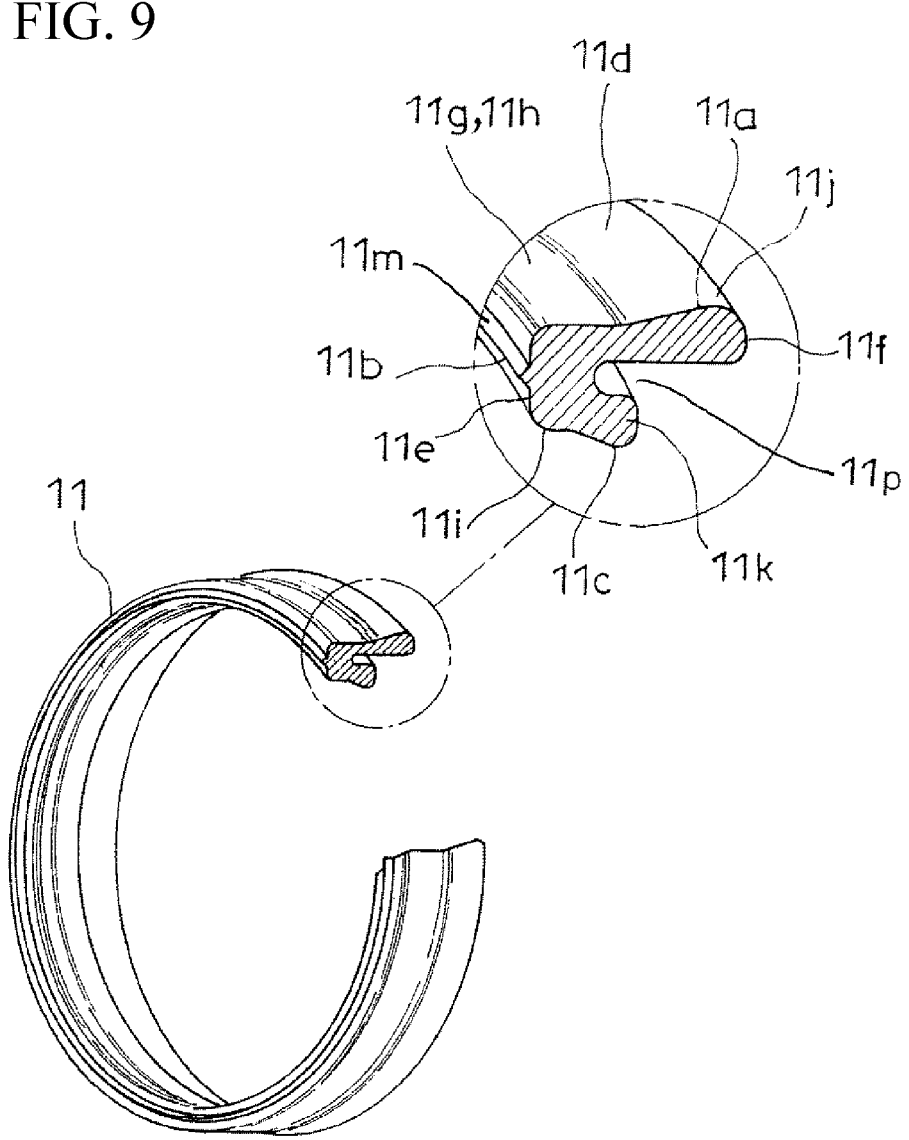
FIG. 9 is a perspective view and a cross-sectional view of essential parts of a seal ring forming the second example.

In a second example shown in FIG. 7 to FIG. 9, the seal ring 11 is provided with a circumference projecting portion 11j projecting backwardly from a base portion 11g positioned on the pressure chamber 4 side, wherein a projecting end side thereof is the first seal portion 11a (see FIG. 9). In the second example, structural portions other than the seal ring 11 are the same as those of the first example.

Also, in the second example, the seal ring 11 further comprises an inner circumference projecting portion 11k projecting backwardly from the base portion 11g inside the circumference projecting portion 11j, wherein a projecting end side thereof is a sliding contact portion against the support rib portion 10g.

Also, in the second example, a projecting size from the base portion 11g of the circumference projecting portion 11j is larger than a projecting size form the base portion 11g of the inner circumference projecting portion 11k.

In the illustrated example, the base portion 11g includes the front end portion 11e forming a face substantially orthogonal to the moving direction x of the piston 1; an outside portion 11h facing an inner face of the cylinder 2; and an inside portion 11i facing the trunk portion 10. In the respect, an outer face of the circumference projecting portion 11j continues to the outside portion 11h; an outer face of the inner circumference projecting portion 11k continues to the inside portion iii; and between an inner face of the circumference projecting portion 11j and an inner face of the inner circumference projecting portion 11k, there is formed a circumference groove-like portion 11p wherein a face facing a back side of the base portion 11g is a groove bottom.

Both the aforementioned circumference projecting portion 11j and inner circumference projecting portion 11k have a short cylinder shape. The base portion 11g is formed in such a way so as to range between a cylinder front end of the circumference projecting portion 11j and a cylinder front end of the inner circumference projecting portion 11k.

Also, the circumference projecting portion 11j projects from the base portion 11g in such a way so as to gradually increase an outer diameter of the seal ring 11 as the circumference projecting portion 11j moves to a back side. Also, the inner circumference projecting portion 11k projects from the base portion 11g in such a way so as to gradually decrease the inner diameter of the seal ring 11 as the inner circumference projecting portion 11k moves to a back side.

In the present embodiment, in a state wherein the circumference projecting portion 11j is slightly elastically deformed toward an inner side of the cylinder 2, the circumference projecting portion 11j can slidingly contact the inner wall 25 of the side portion of the cylinder 2 with the first seal portion 11a on the projecting end side thereof so as to securely seal between the seal ring 11 and the cylinder 2. Also, at the time of the backward movement of the piston 1, the circumference projecting portion 11j can easily bend to the inner side of the cylinder 2 so as to be difficult to become an obstacle to the backward movement.

Also, in the present embodiment, in this respect wherein the inner circumference projecting portion 11k does not obstruct the movement of the seal ring 11 within the predetermined range with the projecting end side thereof, the inner circumference projecting portion 11k can slidingly contact the support rib portion 10g.

Also, in the present embodiment, the second seal portion 11b is formed by a circumference projecting piece 11m formed in the front end portion 11e of the seal ring 11 so as to reliably seal between the seal ring 11 and the trunk portion 10 as well.

Also, in the illustrated example, even at the time of the forward movement of the piston 1, the second circumference outer flange 10e and the movement control portion 10j can be housed in a space 11n located inside the circumference projecting portion 11j and formed at the back side of the inner circumference projecting portion 11k (see FIG. 7) so as to be capable of minimizing a size of the piston 1 in the moving direction of the piston 1.

Figure 10:
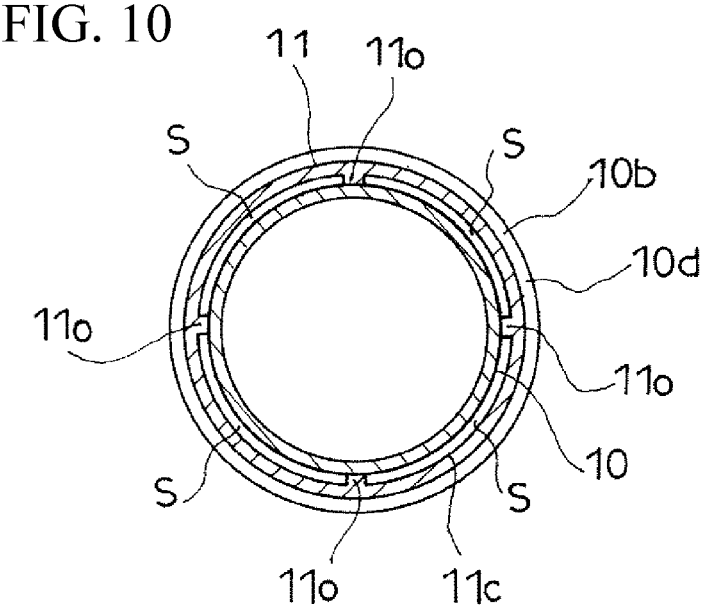
FIG. 10 is a cross-sectional structural view of essential parts of the piston forming the damper (third example) according to one embodiment of the present invention.
Figure 11:
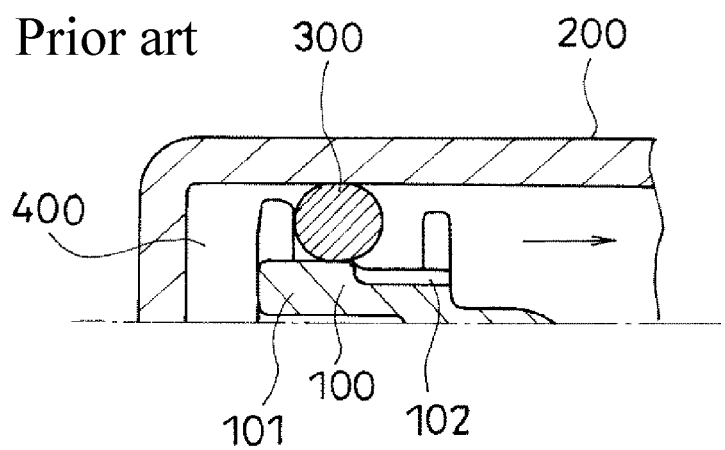
FIG. 11 is a cross-sectional view of essential parts of a conventional damper, and shows a state when a piston moves forward.
Figure 12:
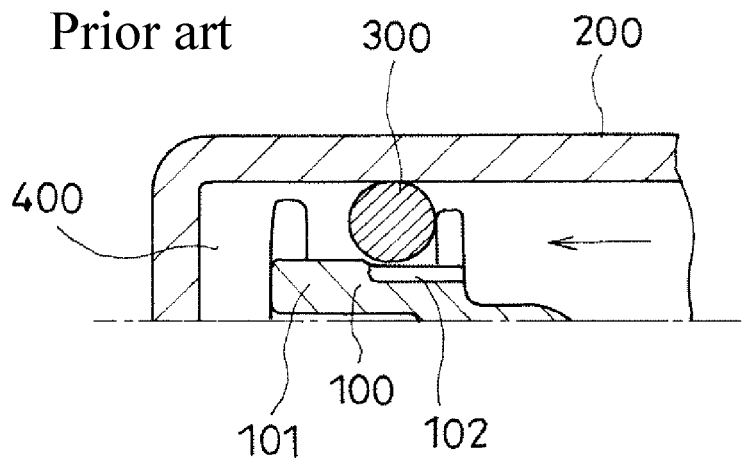
FIG. 12 is a cross-sectional view of the essential parts of the conventional damper, and shows a state when the piston moves backward.

In a third example shown in FIG. 10, the seal ring 11 comprises projecting portions 11o contacting the trunk portion 10 in the inner peripheral portion 11c thereof. Two or more projecting portions 11o are provided at an interval between adjacent projecting portions 11o and 11o in a circumference direction of the seal ring 11, and in the illustrated example, four projecting portions 11o are provided. In the third example, there is formed the movement gap s of the fluid between the inner peripheral portion 11c of the seal ring 11 and the trunk portion 10 by such projecting portions 11o. In the third example, the support rib portion 10g as the support portion is not necessarily required on a trunk portion 10 side; however, the support rib portion 10g may be positioned between the adjacent projecting portions 11o and 11o. Incidentally, the remaining structural portions of the third example are the same as those of the first example, and an explanation thereof is omitted.

Incidentally, obviously, the present invention is not limited to the embodiments explained above, and the embodiments include all embodiments which can obtain the object of the present invention.

EXPLANATION OF SYMBOLS

1 a piston
10 a trunk portion
10d a circumference wall portion
10g support rib portions
11 a seal ring
11a a first seal portion
11b a second seal portion
11d an outer peripheral portion
11e a front end portion
2 a cylinder
4 a pressure chamber
x a moving direction of the piston 1
s a movement gap Incidentally, all contents of the specification, claims, drawings, and abstract of Japanese Patent Application No. 2015-184876 filed on Sep. 18, 2015 are cited in their entireties herein and are incorporated as a disclosure of the specification of the present invention.

What is claimed is:

1. A damper comprising a piston and a cylinder housing the piston, and generating a braking force based on a movement or relative movement of the piston,
   wherein the piston includes a trunk portion and a seal ring surrounding the trunk portion, and
   the trunk portion includes:
   a circumference wall portion projecting from an outer surface of the trunk portion and formed on a pressure chamber side,
   a plurality of support rib portions projecting radially outwardly from the outer surface along a moving direction of the trunk portion and spaced from each other in a circumferential direction of the trunk portion to form spaces therebetween in the circumferential direction, and
   movement control portions projecting radially outwardly from ends of the support rib portions, so that a movement of the seal ring within a predetermined range along the moving direction of the piston is made in a state wherein movement gaps for a fluid are formed between the trunk portion and an inner peripheral portion of the seal ring by the support rib portions and the movement control portions.

2. A damper according to claim 1, wherein front ends of the support rib portions positioned on a pressure chamber side are integrated with the circumference wall portion.

3. A damper according to claim 1, wherein the seal ring includes a circumference projecting portion projecting backwardly from a base portion positioned on a pressure chamber side, wherein an outer peripheral portion on a projecting end side thereof is a first seal portion against an inner wall of the cylinder.

4. A damper according to claim 3, wherein the seal ring further includes an inner circumference projecting portion projecting backwardly from the base portion inside the circumference projecting portion, wherein a projecting end side thereof is a sliding contact portion against the support rib portions.

5. A damper according to claim 4, wherein a projecting size from the base portion of the circumference projecting portion is larger than a projecting size form the base portion of the inner circumference projecting portion.

6. A damper according to claim 3, wherein a second seal portion is formed by a circumference projecting piece formed in a front end portion of the seal ring.

7. A damper comprising a piston and a cylinder housing the piston, and generating a braking force based on a movement or relative movement of the piston,
   wherein the piston includes a trunk portion and a seal ring surrounding the trunk portion, and
   the trunk portion includes:
   a circumference wall portion projecting from an outer surface of the trunk portion and formed on a pressure chamber side,
   a plurality of support rib portions projecting radially outwardly from the outer surface along a moving direction of the trunk portion and spaced from each other in a circumferential direction of the trunk portion to form spaces therebetween in the circumferential direction, and
   movement control portions projecting radially outwardly from ends of the support rib portions, so that a movement of the seal ring within a predetermined range along the moving direction of the piston is made in a state wherein movement gaps for a fluid are formed between the trunk portion and an inner peripheral portion of the seal ring by the support rib portions and the movement control portions,
   wherein the seal ring includes a circumference projecting portion projecting backwardly from a base portion positioned on a pressure chamber side, wherein an outer peripheral portion on a projecting end side thereof is a first seal portion against an inner wall of the cylinder,
   wherein the seal ring further includes an inner circumference projecting portion projecting backwardly from the base portion inside the circumference projecting portion, wherein a projecting end side thereof is a sliding contact portion against the support rib portions,
   wherein a projecting size from the base portion of the circumference projecting portion is larger than a projecting size form the base portion of the inner circumference projecting portion, and
   wherein the inner circumference projecting portion is located between the circumference wall portion and the movement control portions, and an end portion of the circumference projecting portion away from the base portion is located outside the movement control portions.

8. A damper according to claim 1, wherein the trunk portion further includes a circumference outer flange spaced from the circumference wall portion in the moving direction, the movement control portions being provided on the circumference outer flange.

* * * * *